Sept. 28, 1948.    F. J. MASON    2,450,245
SANDING DEVICE FOR VEHICLES
Filed Oct. 2, 1944    4 Sheets-Sheet 1
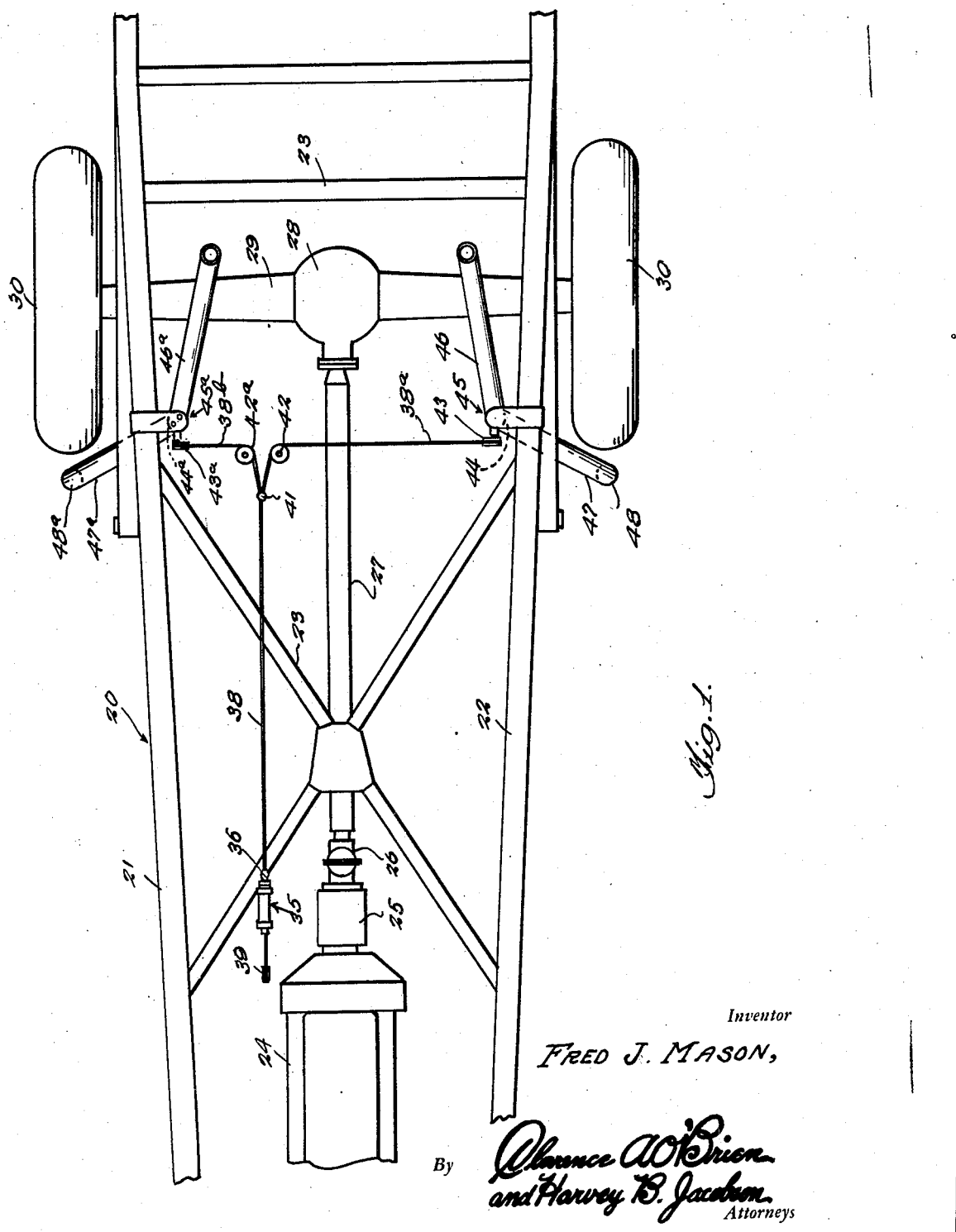
Inventor
FRED J. MASON,
By *Clarence A. O'Brien and Harvey B. Jacobson*
Attorneys Sept. 28, 1948. F. J. MASON 2,450,245
SANDING DEVICE FOR VEHICLES
Filed Oct. 2, 1944 4 Sheets-Sheet 2
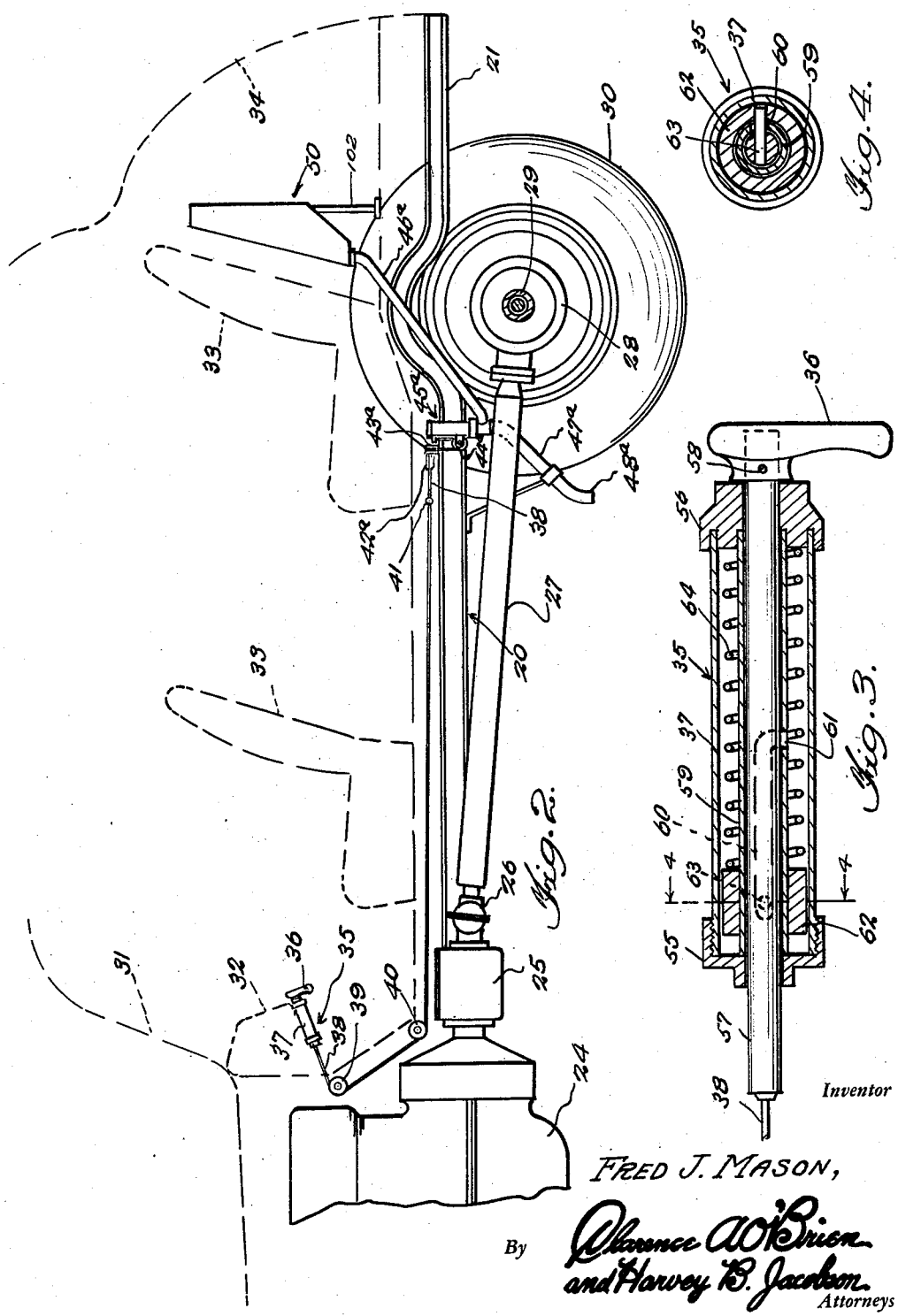
Inventor
FRED J. MASON,
By *Clarence A. O'Brien*
*and Harvey B. Jacobson*
Attorneys Sept. 28, 1948.    F. J. MASON    2,450,245
SANDING DEVICE FOR VEHICLES
Filed Oct. 2, 1944    4 Sheets-Sheet 3
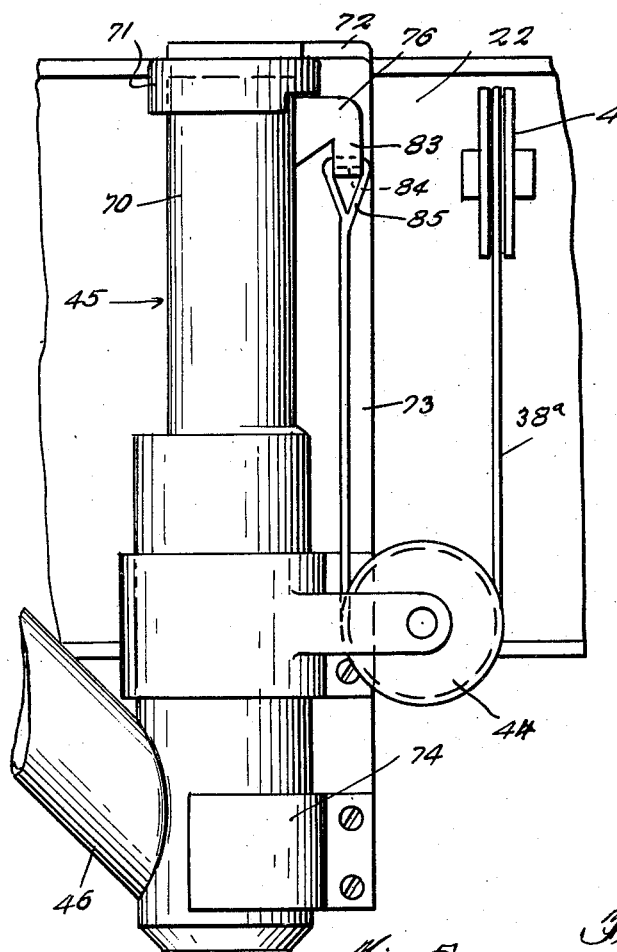
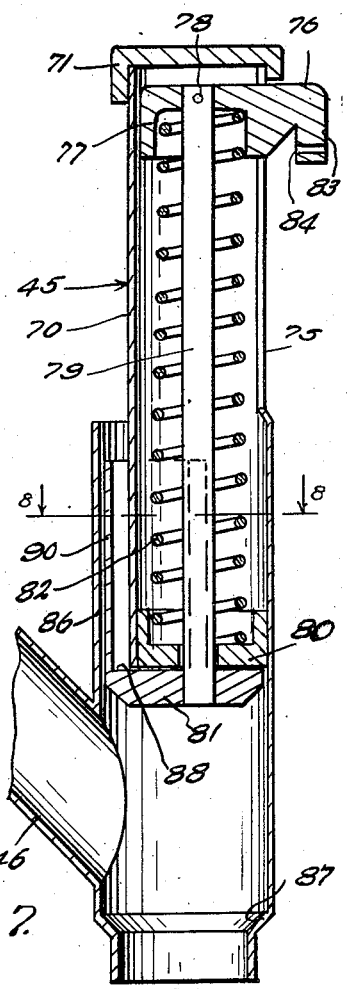
Inventor
FRED J. MASON,
By *Clarence A. O'Brien and Harvey B. Jacobson*
Attorneys Sept. 28, 1948. F. J. MASON 2,450,245
SANDING DEVICE FOR VEHICLES
Filed Oct. 2, 1944 4 Sheets-Sheet 4

Inventor
FRED J. MASON,
By Clarence A. O'Brien
and Harvey B. Jacobson
Attorneys

Patented Sept. 28, 1948

2,450,245

UNITED STATES PATENT OFFICE 2,450,245

SANDING DEVICE FOR VEHICLES

Fred J. Mason, Syracuse, N. Y.

Application October 2, 1944, Serial No. 556,785

7 Claims. (Cl. 291—25)

1

This invention relates to a sander, and more particularly to a sanding device for vehicles, such as automobiles, trucks, and the like.

A primary object of this invention is the provision of an improved sanding device adapted to deposit sand adjacent the rear wheels of a vehicle, in such manner as to afford improved traction on wet, slippery or icy streets or roads.

An additional object of this invention is the provision of such a device having means whereby the flow of sand may be conveniently controlled, positioned adjacent the driver of the vehicle, as, for example, from a control device on the dashboard or steering column of the vehicle.

Still another object of this invention is the provision of a vehicle having a built-in sand tank, positioned in a convenient location, normally out of the way of the occupants or cargo of the vehicle.

Still another object is the provision in such a device of means for manually shutting off the flow of sand, at a point adjacent the tank, whereby the remote control may be rendered inoperative when it is not desired to utilize the device, and whereby the tank may be removed when its use is not desirable without spilling of the contents thereof.

A more specific object is the provision of an improved valve means for releasing the sand from the container when desired, so arranged as to provide a minimum of resistance to the opening and closing of the valve from the sand.

A still further object is the provision of a remote control device which may be operated with a minimum of effort, to release the sand or cut off the flow thereof.

Still another specific object of the invention resides in the provision of means facilitating the delivery of sand from the tank to remote points for distribution, particularly adapted to be utilized under circumstances where the positioning of the tank for gravity feed of the sand is impracticable.

Still another object resides in the provision of such a mechanism which will be sturdy and durable in construction, reliable and efficient in operation, and relatively simple and inexpensive to manufacture and install on a vehicle. A further object is the provision of such a device which may be readily installed on a conventional vehicle with a minimum of difficulty.

Other objects reside in the combinations of elements, features of construction, and arrangements of parts, all as will be more fully pointed out hereinafter and disclosed in the accompanying drawings, wherein there are shown preferred embodiments of this inventive concept.

In the drawings:

Figure 1 is a fragmentary top plan view of the frame of a vehicle having one form of apparatus in accordance with the instant invention applied thereto, certain portions of the mechanism being cut away.

Figure 2 is a fragmentary side elevational view of a vehicle frame, certain portions of the body being indicated in dotted lines, showing the apparatus of the instant invention as applied thereto.

Figure 3 is an enlarged sectional view of a constructional detail.

Figure 4 is a sectional view taken substantially along the line 4—4 of Figure 3.

Figure 5 is an enlarged fragmentary elevational view of a further constructional detail.

Figure 6 is a top plan view of the device shown in Figure 5, certain concealed portions thereof being indicated by dotted lines.

Figure 7 is a sectional view taken substantially along the line 7—7 of Figure 6, as viewed in the direction indicated by the arrows.

Figure 8 is a sectional view taken substantially along the line 8—8 of Figure 7, as viewed in the direction indicated by the arrows.

Like reference numerals refer to like parts throughout the several views of the drawings.

Figure 9:
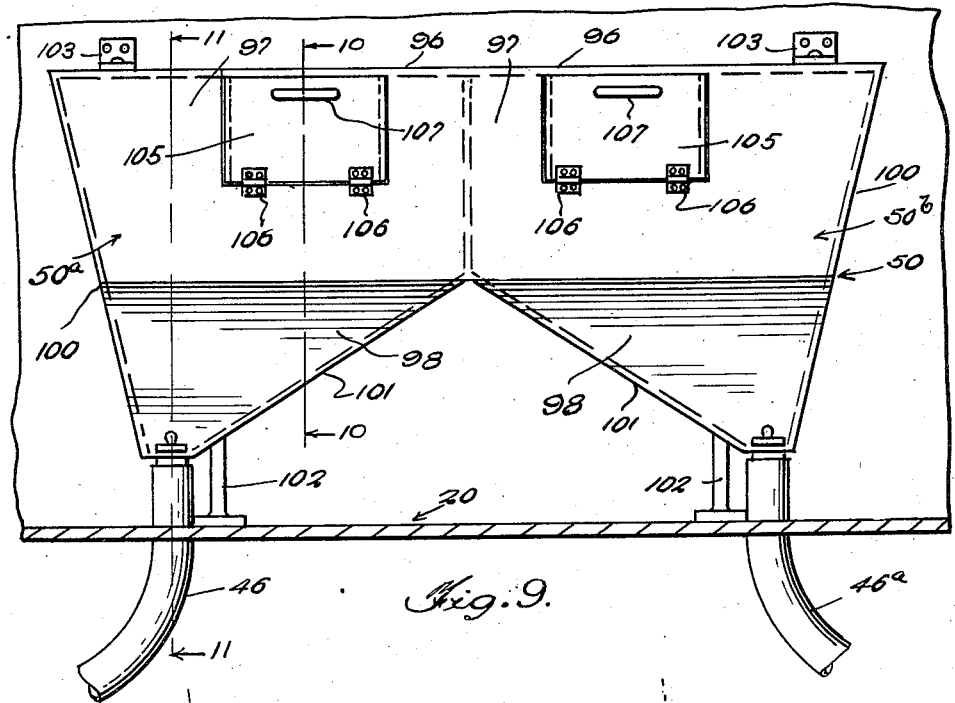
Figure 9 is a rear elevational view of the sand tank comprising an element of the instant invention, portions of the vehicle frame being shown in section.

Having reference now to the drawings, there is generally indicated at 20 a conventional vehicle frame of any desired type, comprised of side members 21 and 22 and suitable transverse members 23. Frame 20 supports a conventional motor 24, transmission 25, universal joint 26, torque shaft 27, differential 28 and rear axle 29 supporting rear wheels 30. As indicated by dotted lines in Figure 2, the frame 20 carries a body 31 including a dashboard 32, seat 33 and a luggage compartment 34, or other space, positioned to the rear of a seat 33. The mechanism heretofore described has been conventional and may take any desired form, and the frame 20 supports such other mechanism as is conventionally applied to such a vehicle.

Having reference now to the instant invention, the same is comprised of a dashboard control generally indicated at 35, including a handle 36 and a cylinder 37. Movement of handle 36 controls, in a manner to be described hereinafter, the movement of a cord or cable 38 which passes over suitable pulleys 39, 40, to a connection 41, at which point it splits into two portions, 38a and 38b. Portion 38a passes over pulleys 42, 43 and 44, to operate a control valve generally indicated at 45, to be more fully described hereinafter, adapted to control the flow of sand from an inlet pipe 46 to a spout 47, the extremity of which is positioned adjacent and slightly in front of one of rear wheels 30. The pipe 46 leads to an adjacent portion of a sand-containing receptacle generally indicated at 50, to be more fully described hereinafter, positioned at a convenient point in the vehicle body 31, as, for example, in the luggage compartment 34 behind the rear seat 33. The other portion 38b of cable 38 passes over pulleys 42a, 43a, and 44a, to control a similar valve mechanism 45a positioned on the opposite side of the vehicle, to control the flow of sand from an inlet 46a to a spout 47a, the extremity of which 48a is positioned adjacent and in front of the opposite of rear wheels 30. The extremity of inlet pipe 46a likewise leads to tank 50.

Inasmuch as the devices 45 and 45a and their associated inlet and outlet spouts, and associated parts, are substantially identical with the exception of positioning, only one of each will be described in detail hereinafter.

Having particular reference to Figures 3 and 4, and referring back to the control member 35, it will be seen that sleeve 37 is provided with apertured end caps 55 and 56, through the apertures of which passes a control rod 57, secured in fixed relation, as by a pin 58, to handle member 36, in such manner that it will both rotate and move longitudinally with respect to sleeve 37, in accordance with corresponding movement of handle 36. The extremity of control cable 38 is fixedly secured to the opposite end of the rod 57. A second sleeve 59 is positioned within sleeve 37, closely surrounding rod 57 and provided with an elongated slotted aperture 60, one extremity of which is curved at right angles, and extends about an arc at right angles to the longitudinal portion of the slot, comprising approximately 90° of the surface of the sleeve 59, as indicated at 61. Surrounding the sleeve 37 is a collar 62, having a pin 63 fixedly secured in the interior thereof, passing through slot 60, and engaging in a suitable bore or aperture in rod 57. A compression spring 64 is positioned between collar 62 and end cap 56, between the sleeves 37 and 59.

Now, from the foregoing it will be seen that if the handle 36 is pulled outwardly, that is, away from the dashboard 32, it will effect a corresponding pull on the control cable 38, simultaneously moving the collar 62 to compress the spring 64. If the handle is then given a quarter turn, the pin will pass into the curved portion 61 of the slot 60, whereupon the assembly will be latched in such position. In order to release such latching effect, the handle 36 need be given only a quarter turn in the opposite direction, until the pin 60 is in alignment with the longitudinally extending portion of the slot 60, whereupon the spring 64 will bias the same back to the position shown in Figure 3, with the handle 36 in abutting relation to the exterior surface of end cap 56, the control cable 38 being moved, by mechanism to be more fully described hereinafter, accordingly.

Having reference now to the valve assembly generally indicated at 45, and referring particularly to Figures 5 to 8, inclusive, it will be seen that the device is comprised of a sleeve 70, provided with a cap 71, to which is secured the upper portion 72 of bracket member 73, the lower portion 74 of bracket 73 surrounding the lower portion of the sleeve, and the bracket 73 being secured to frame member 22 in any desired manner. Sleeve 70 has a slot 75 therein, through which extends an arm 76 attached to a cup-shaped member 77 positioned within the sleeve 70. Member 77 has secured thereto, as by a pin 78, the extremity of an operating rod 79, terminating in a valve member 80. Positioned at an intermediate portion of the sleeve 70 is a collar 81, through which rod 79 is adapted to be passed, and a compression spring 82 is seated between the collar 81 and the lower extremity of member 77, normally biasing the extending arm 76 to the uppermost portion of the slot 75. Arm 76 terminates in a downwardly depending portion 83, having a bore 84 therethrough, adapted to be engaged by a loop 85 in the extremity of control cable 38a.

It will now be seen that pressure exerted on the cable 38 by operating handle 36, in the manner previously described serves, through the pulley system to pull the arm 76, and hence the cap 77, downwardly to move the valve 88 against the bias of the spring 82. Conversely, it will be seen that when the pressure exerted by the extension of the operating handle 36 is released, the pressure of the spring 82 will serve to tension the cables 38a and 38b, and consequently cable member 38.

The lower portion of sleeve 70 is enlarged to provide a semi-circular flange 86, of a greater radius of curvature than the sleeve 70, a portion of which extends upwardly outside of sleeve 70 to form a recess of arcuate configuration. Inlet tube 46 empties into the enlarged portion of sleeve 70, at a position below the uppermost position of the valve 80 when biased upwardly by the spring 82, and the lowermost point of the combined sleeves 86, 70 is provided with a valve seat 87. The valve 80 is provided with an extending semi-circular portion 88 adapted to conform to the interior configuration of the combined sleeves, and has peripherally positioned around the portion 88 an upwardly extending, semi-circular flange 90. Flange 90 is adapted to closely conform to the interior diameter of portion 86, the arrangement being such that when the valve 80 is moved downwardly to engage the valve seat 87, the flange 90 moves downwardly adjacent the opening of inlet 46 into the sleeve, to completely close and seal the same.

Thus, it will be seen that the valve 80 may be moved upwardly and downwardly, and that when such downward movement is effected, the passage of sand from the inlet 46 to the spout 47 is precluded, and the movement upwardly permits free passage thereof, it being further noted that the flange 90 covering inlet 46, when the valve is in closed position, precludes the passage of sand from the inlet into the space above the valve member 80, whereby the opening of the valve against the weight of sand thereon is obviated.

From the foregoing it will now be seen that when the handle 36 is moved outwardly, the valve device 45 is in closed position, and may be latched in such closed position merely by a quarter turn of the handle 36. It will correspondingly be seen that when it is desired to open the device, a reverse quarter turn of the handle releases the compression of spring 64, and correspondingly the tension on the cord or cable 38, to relieve the force exerted on the arm 76, whereupon the spring 82 serves to bias the valve to open position. Thus, when the handle 36 is pulled out and latched, the valve interrupts the flow of sand from the tube 46 to the spout 47, and correspondingly, when the handle is released and in its innermost position, the valve is opened and such sand may flow therethrough. Obviously, to re-close the valve, the handle 36 need merely be pulled out and latched in position in the manner previously described.

Figures 10, 11:
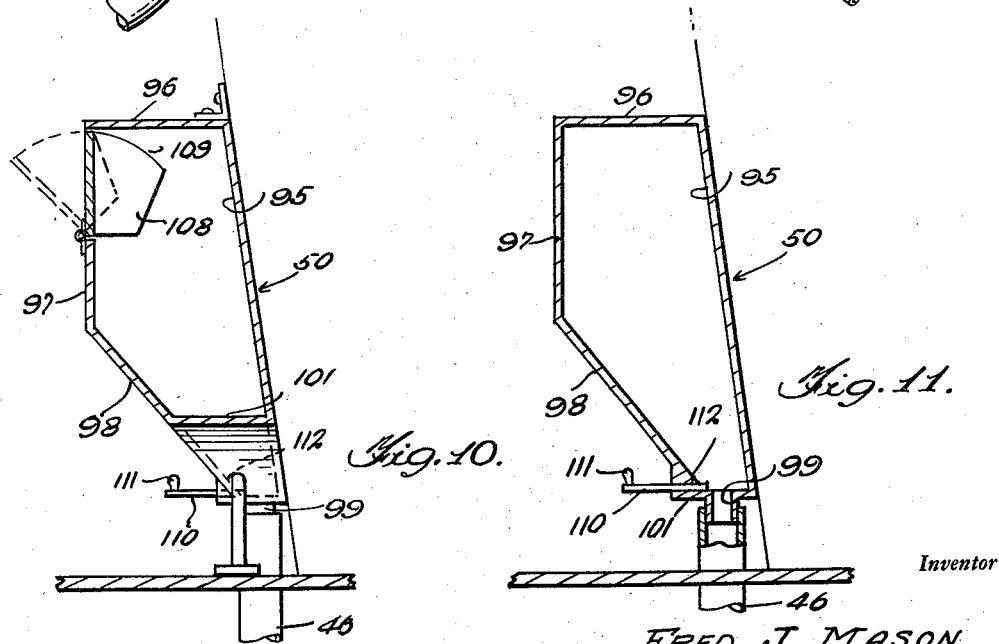
Figure 10 is a sectional view taken substantially along the line 10—10 of Figure 9, as viewed in the direction indicated by the arrows.
Figure 11 is a sectional view taken substantially along the line 11—11 of Figure 9, as viewed in the direction indicated by the arrows.

Having reference now to the receptacle 50 adapted for containing the sand, as more particularly shown in Figures 9, 10 and 11, it will be seen that the same is comprised of two substantially identical but oppositely positioned tanks 50a and 50b. Each of the tanks is comprised of an angularly inclined side wall 95, adapted to rest against the back seat of a vehicle, or in a similar position, and a relatively horizontal top wall 96 from which a vertical rear wall 97 extends to a point substantially mid-way of the receptacle. From rear wall 97 an angularly inclined portion 98 slopes forwardly to an outlet 99 adapted to communicate with the member 46. The outer end walls 100 are sloped at an angle toward the outlet 99, while the bottom walls 101 are inclined in a similar manner. Thus, it will be seen that the tendency of all the wall surfaces of the tank is to incline toward the outlet in such manner as to direct the sand therewithin toward the outlet, to fall therethrough by gravity. Supporting members 102 mounted on frame 20 serve to support the tank, while brackets 103 secured to the rear of the seat, or the like, and the top wall 96 of the tank serve to hold the same in position.

Means are provided for filling the receptacles 50a and 50b, such means taking the form of closure members 105 adapted to close apertures in the rear walls 97 of the tank, and hinged at their lower edges, as by hinges 106, to the side wall 97. Each of members 105 is provided with a handle or finger grip 107 and has, as best shown in Figure 10, two inwardly extending flanges 108, having arcuate extremities 109, so arranged as to close the sides of the space between the cover member 105 and the receptacle, thus forming a spout, when the cover is open.

Suitable manually controlled valves are placed adjacent the outlet 99, in order to cut off the flow of sand to the valve means 45 when such flow is not desired, or to preclude leakage of sand from the receptacles, when, for any reason, it is desired to remove the same from the vehicle body. Such valves may be of any desired type, but preferably take the form of slides 110 provided with handle members 111, engaging in a suitable slotted groove 112 adjacent the outlet 99.

Now, from the foregoing the operation of the device should be readily understandable. When it is desired to utilize the structure of the instant invention, the slides 110 are first opened permitting the sand to flow through tube 46 to the valve device 45, which valve is normally retained in closed position, in the manner previously described, by the outward movement of the handle member 36. When it is desired to utilize sand for any purpose, such as to provide safe tractive force for the car when the same is braked, or alternatively, to provide traction when starting on a slippery surface, the handle is given a quarter of a turn necessary to release the pin 63 from its engagement in the end 61 of slot 60, whereupon the springs 64 and 82 will move the valve to open position, allowing a desired quantity of sand to pass through the devices 45 and out of the extremities 48 of spout 47 to the ground at a point adjacent the rear wheels 30 to provide the necessary abrasive to form a tractive surface. After a sufficient quantity of sand has been released, the handle is pulled outwardly and the pin latched in the slot in the manner previously described, whereupon the device is again ready for use at any desired time. When the conditions resulting in the necessity for the use of the device, such as snow or ice formed on roads, have disappeared, the manually operated slides 111 may be utilized to discontinue the flow of sand to the valve member 45, thus rendering immaterial the position of the handle 36, and obviating possible loss of sand by the accidental tripping of the same from its spring biased position.

Now, from the foregoing, it will be seen that there is herein provided a construction accomplishing all the objects of this invention and others, including many advantages of great practical utility and commercial importance.

As many embodiments may be made of this inventive concept, and as many modifications may be made in the embodiments hereinbefore shown and described, it is to be understood that all matter herein is to be interpreted merely as illustrative and not in a limiting sense.

I claim:

1. Road sanding equipment comprising a vertically disposed tubular body having a sand discharge opening at its lower end and a sand inlet port opening through its side above the discharge opening, a valve seat between the discharge opening and the port and formed by the tubular body, a manually operable valve mounted in the tubular body to move longitudinally thereof and means within the body yieldingly to urge the valve upwardly away from the seat and clear of the port and means connected to said body urging said valve into closed position.

2. Road sanding equipment comprising a vertically disposed tubular body having a sand discharge opening at its lower end and a sand inlet port opening through its side above the discharge opening, a valve seat between the discharge opening and the port and formed by the tubular body, a manually operable valve mounted in the tubular body to move longitudinally thereof, means within the body yieldingly to urge the valve upwardly away from the seat and clear of the port, and an upwardly extending arcuate flange adjacent said inlet carried by the valve to close the port means connected to said body urging said valve into closed position when the valve is seated on the valve seat.

3. Road sanding equipment comprising a vertically disposed tubular body having a sand discharge opening at its lower end and a sand inlet port opening through its side above the discharge opening, a valve seat between the discharge opening and the port and formed by the tubular body, a manually operable valve mounted in the tubular body to move longitudinally thereof and means within the body yieldingly to urge the valve upwardly away from the seat and clear of the port, said tubular body having an elongated slot opening through its side above the port and a manually actuated operating arm extending through the slot and connected with the valve to move the valve to closed position against the effort of the yielding means.

4. Road sanding equipment comprising a vertically disposed tubular body having a sand discharge opening at its lower end and a sand inlet port opening through its side above the discharge opening, a valve seat between the discharge opening and the port means connected to said body urging said valve into closed position, a manually operable valve mounted in the tubular body to move longitudinally thereof, means within the body yieldingly to urge the valve upwardly away from the seat and clear of the port, said tubular body having an elongated slot opening through its side above the port, a manually actuated operating arm extending through the slot and connected with the valve to move the valve to closed position against the effort of the yielding means, and an upwardly extending arcuate flange adjacent said inlet carried by the valve to close the port when the valve is seated on the valve seat.

5. Road sanding equipment comprising a vertically disposed tubular body having a sand discharge opening at its lower end and a sand inlet port opening through its side above the discharge opening, a valve seat between the discharge opening and the port means connected to said body urging the said valve into closed position, a manually operable valve mounted in the tubular body to move longitudinally thereof, means within the body yieldingly to urge the valve upwardly away from the seat and clear of the port, said tubular body having an elongated slot opening through its side above the port, a manually actuated operating arm extending through the slot and connected with the valve to move the valve to closed position against the effort of the yielding means, a control rod remote from the tubular body, and a flexible member coupled to the operating arm and the control rod and exerting a downward thrust against the upwardly urging means whereby when pull is exerted on the control rod the valve will be moved to closed position.

6. Road sanding equipment comprising a vertically disposed tubular body having a sand discharge opening at its lower end and a sand inlet port opening through its side above the discharge opening, a valve seat between the discharge opening and the port, means connected to said body urging said valve into closed position, a manually operable valve mounted in the tubular body to move longitudinally thereof, means within the body yieldingly to urge the valve upwardly away from the seat and clear of the port, said tubular body having an elongated slot opening through its side above the port, a manually actuated operating arm extending through the slot and connected with the valve to move the valve to closed position against the effort of the yielding means, a control rod remote from the tubular body, a flexible member coupled to the operating arm and the control rod and exerting a downward thrust against the upwardly urging means whereby when pull is exerted on the control rod the valve will be moved to closed position, a guide sleeve surrounding the control rod, said sleeve having an elongated slot extending longitudinally through its side, a collar slidable on the sleeve, a pin extending radially from the control rod through the slot and into the collar, a spring bearing on the collar yieldingly to project the control rod longitudinally of the sleeve in a direction to relax the tension on the flexible member and the slot having an angular extension at one end to receive the pin and hold the rod retracted against the spring.

7. Road sanding equipment including a vertically disposed tubular body having a sand discharge opening at its lower end and a sand inlet port opening through its side above the discharge opening, said tubular body tapering into a valve seat adjacent its opening, a valve mounted in the tubular body to move longitudinally thereof, a fixed collar within said body to limit movement of said valve, a movable collar spaced from said fixed collar, said spacing means including resilient means connected between said collars and urging said valve upwardly away from said seat, downwardly urging means connected to said movable collar, and an arcuate flange adjacent said inlet carried by the valve to close the port when the valve is seated on the valve seat.

FRED J. MASON.

REFERENCES CITED

The following references are of record in the file of this patent:

UNITED STATES PATENTS

| Number | Name | Date |
|---|---|---|
| 490,896 | Bunker | Jan. 31, 1893 |
| 675,289 | Parks | May 28, 1901 |
| 677,554 | Bacon | July 2, 1901 |
| 710,072 | Potter | Sept. 30, 1902 |
| 772,218 | Cooper | Oct. 11, 1904 |
| 802,230 | Moss | Oct. 17, 1905 |
| 896,968 | Barnett | Aug. 25, 1908 |
| 990,016 | Shull | Apr. 18, 1911 |
| 1,156,111 | Tabor | Oct. 12, 1915 |
| 1,314,867 | Gray | Sept. 2, 1919 |
| 1,375,541 | Todt | Apr. 19, 1921 |
| 1,389,544 | Butler | Aug. 30, 1921 |
| 1,524,318 | Scott | Jan. 27, 1925 |
| 1,619,117 | Gray | Mar. 1, 1927 |
| 1,648,623 | Robinson | Nov. 8, 1927 |
| 1,779,472 | Imingen | Oct. 28, 1930 |
| 1,786,377 | Whipple | Dec. 23, 1930 |
| 1,834,625 | Kegler | Dec. 1, 1931 |
| 1,973,083 | Levorchick et al. | Sept. 11, 1934 |
| 2,033,522 | Boyer et al. | Mar. 10, 1936 |
| 2,243,243 | Campbell | May 27, 1941 |
| 2,256,290 | McCune | Sept. 16, 1941 |

FOREIGN PATENTS

| Number | Country | Date |
|---|---|---|
| 688,150 | France | Aug. 19, 1930 |